US008463859B2

(12) United States Patent
Provo et al.

(10) Patent No.: US 8,463,859 B2
(45) Date of Patent: Jun. 11, 2013

(54) EMAIL SYSTEM INCLUDING SYNCHRONIZATION SERVER(S) PROVIDING SYNCHRONIZATION BASED UPON SYNCHRONIZATION INDICATORS STORED ON MOBILE DEVICES AND RELATED METHODS

(75) Inventors: Nathan Provo, Ravensdale, WA (US); David Clarke, Redmond, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 318 days.

(21) Appl. No.: 12/829,687

(22) Filed: Jul. 2, 2010

(65) Prior Publication Data
US 2012/0005283 A1  Jan. 5, 2012

(51) Int. Cl.
*G06F 15/16* (2006.01)

(52) U.S. Cl.
USPC .......................................... 709/206; 709/248

(58) Field of Classification Search
USPC ................................................. 709/206, 248
See application file for complete search history.

(56) References Cited

U.S. PATENT DOCUMENTS

| 8,005,922 | B2 * | 8/2011 | Boudreau et al. | 709/217 |
| 8,086,677 | B2 * | 12/2011 | Murphy | 709/206 |
| 2005/0039048 | A1 | 2/2005 | Tosey | 713/201 |
| 2008/0109448 | A1 * | 5/2008 | Aboel-Nil et al. | 707/10 |
| 2008/0194276 | A1 | 8/2008 | Lin et al. | 455/466 |
| 2009/0031296 | A1 * | 1/2009 | Boudreau et al. | 717/174 |
| 2009/0070429 | A1 * | 3/2009 | Murphy | 709/206 |
| 2009/0138547 | A1 * | 5/2009 | Boudreau | 709/203 |
| 2009/0271621 | A1 | 10/2009 | Mendelovich et al. | 713/168 |

FOREIGN PATENT DOCUMENTS

| EP | 1993244 | 11/2008 |
| WO | 03061238 | 7/2003 |

OTHER PUBLICATIONS

"OneBridge Mobile Platform Security" (Technical Brief) iAnywhere Solutions 2006; www.iAnywhere.com.
"Stateless" http://web.archive.org/web/20071223141426/http://www.pcmag.com/encyclopedia_term/0 . . . Jul. 24, 2012.

* cited by examiner

*Primary Examiner* — Liangche A Wang
(74) *Attorney, Agent, or Firm* — Allen, Dyer, Doppelt, Milbrath & Gilchrist, P.A.

(57) ABSTRACT

An email system may include an email server(s) configured to store email messages in a plurality of mailboxes, and a plurality of mobile wireless communications devices each configured to store email messages and an email synchronization indicator for a respective mailbox. The system may further include an email synchronization server(s) configured to establish synchronization sessions with the mobile wireless communications devices and retrieve the email synchronization indicators therefrom, and determine changes to the mailboxes and synchronize respective email messages between the mobile wireless communications devices and the email server(s) during the synchronization sessions based upon the retrieved email synchronization indicators. The email synchronization server(s) may also be configured to communicate updated email synchronization indicators to the mobile wireless communications devices, and terminate the synchronization sessions without storing of the updated email synchronization indicators at the email synchronization server(s).

24 Claims, 10 Drawing Sheets

EMAIL SYSTEM INCLUDING SYNCHRONIZATION SERVER(S) PROVIDING SYNCHRONIZATION BASED UPON SYNCHRONIZATION INDICATORS STORED ON MOBILE DEVICES AND RELATED METHODS

TECHNICAL FIELD

This application relates to the field of communication systems, and more particularly, to electronic mail (email) systems and related methods.

BACKGROUND

Electronic mailboxes reside on email servers and are used to store email messages. Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAs) are applications which use a technique called polling to relay messages from the email server to the mail program at a user's computer or mobile wireless communications device. A MUA is a program running either on a user's personal computing device (mobile or stationary), or on a shared email relay or polling server that checks for new mail on behalf of a multitude of such users.

DETAILED DESCRIPTION

Figure 1:
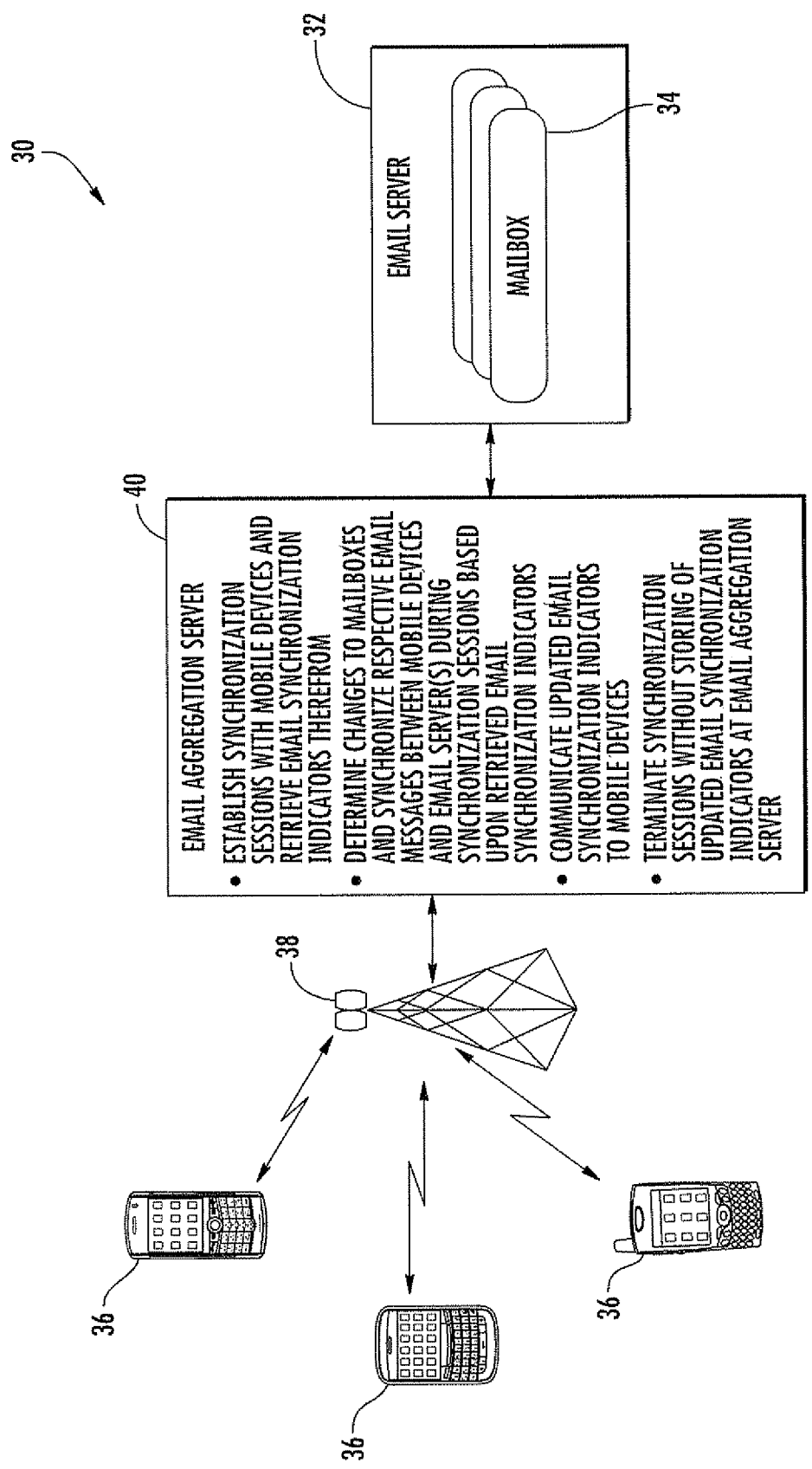
FIG. 1 is a schematic block diagram of an email system in accordance with an example embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, an electronic mail (email) system is disclosed herein which may include at least one email server configured to store email messages in a plurality of mailboxes, and a plurality of mobile wireless communications devices (also referred to herein as mobile devices) each configured to store email messages and an email synchronization indicator for a respective mailbox. The system may further include at least one email synchronization server configured to establish synchronization sessions with the mobile wireless communications devices and retrieve the email synchronization indicators therefrom, and determine changes to the mailboxes and synchronize respective email messages between the mobile wireless communications devices and the at least one email server during the synchronization sessions based upon the retrieved email synchronization indicators. The at least one email synchronization server may also be configured to communicate updated email synchronization indicators to the mobile wireless communications devices, and terminate the synchronization sessions without storing of the updated email synchronization indicators at the at least one email synchronization server. As such, the email synchronization server(s) may usefully perform the email synchronization operations for the mobile devices, saving their battery and processing resources, yet without having to store email synchronization indicators for numerous mobile wireless communications devices, which saves email synchronization server memory resources.

In some embodiments, the at least one email synchronization server may comprise a plurality of geographically distributed email synchronization servers which cooperate to replicate synchronization sessions to one another based upon server outages. The email synchronization indicator may comprise at least one of a unique identification (ID) of a last retrieved email message, an Internet Message Access Protocol (IMAP) (or other email protocol) high water mark, and a synchronization anchor, for example.

In addition, the mobile wireless communications devices may be further configured to store server access data, and the at least one email synchronization server may be further configured to retrieve the server access data from the mobile wireless communications devices and determine changes to the mailboxes also based thereon. By way of example, the server access data may comprise at least one of a server host address, a server port address, and a server Secure Sockets Layer (SSL) indicator. Similarly, the mobile wireless communications devices may further be configured to store mailbox access data or login credential data, and the at least one email synchronization server may be further configured to retrieve the mailbox access data or login credential data from the mobile wireless communications devices and determine changes to the mailboxes also based thereon.

Furthermore, the at least one server and the mobile wireless communications devices may be further configured to store calendar data, contact data, or other data related to a user's account with an Internet Service Provider. As such, the at least one email synchronization server may be further configured to synchronize respective calendar data, contact data, or other data between the mobile wireless communications devices and the at least one server during the synchronization sessions. Also by way of example, at least some of the mobile wireless communications devices may comprise cellular devices.

A related email method may include storing email messages in a plurality of mailboxes on at least one email server, storing email messages and an email synchronization indicator for a respective mailbox on a plurality of mobile wireless communications devices, and establishing synchronization sessions between at least one email synchronization server and the mobile wireless communications devices and retrieving the email synchronization indicators from the mobile wireless communications devices to the at least one email synchronization server. The method may further include determining changes to the mailboxes and synchronizing respective email messages between the mobile wireless communications devices and the at least one email server during the synchronization sessions at the at least one email synchronization server based upon the retrieved email synchronization indicators. In addition, updated email synchronization indicators may be communicated from the at least one email synchronization server to the mobile wireless communications devices, and the synchronization sessions may be terminated without storing of the updated email synchronization indicators at the at least one email synchronization server.

Figure 2:
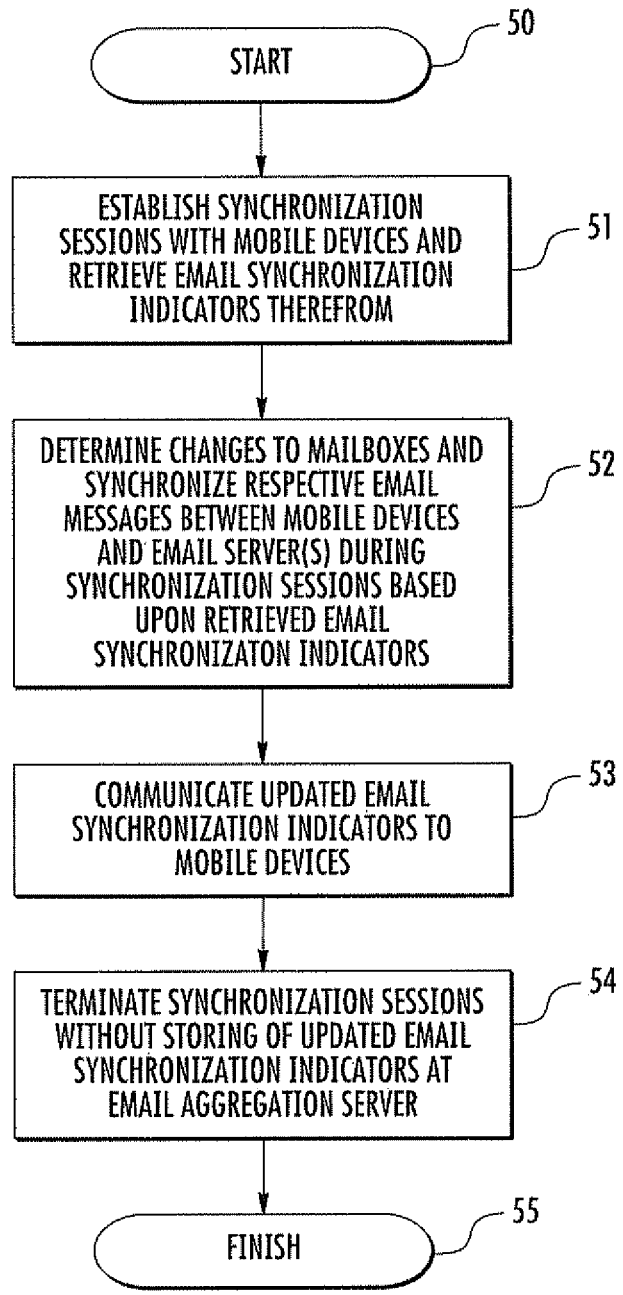
FIGS. 2 and 3 are flow diagrams illustrating method aspects associated with the system of FIG. 1.
Figure 3:
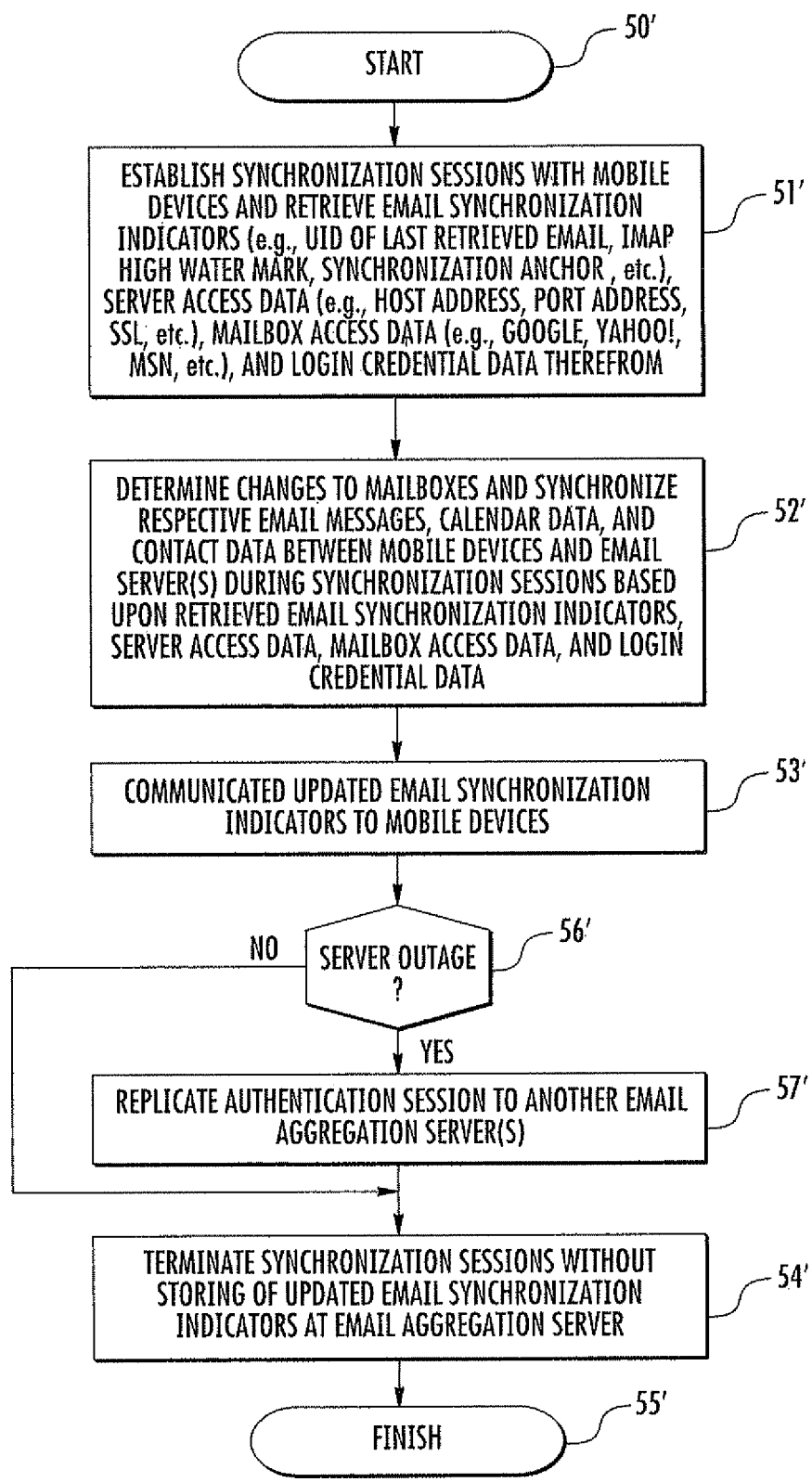

Referring initially to FIGS. 1 through 3, an electronic mail (email) system 30 illustratively includes one or more email servers 32 configured to store email messages in a plurality of mailboxes 34 hosted thereon, as will be appreciated by those skilled in the art. For example, the email server(s) 32 may be a corporate or ISP server (e.g., GMail, Yahoo! mail, MSN mail, etc.). The system 30 further illustratively includes a plurality of mobile wireless communications devices 36 (also referred to as "mobile devices" herein) each configured to store email messages. In the illustrated example, the mobile devices 36 are cellular devices which communicate via a cellular network (illustratively shown as a cellular tower 38 in FIG. 1). However, the mobile devices 36 may instead, or in addition, communicate via other wireless formats, such as wireless LAN (e.g., 802.11x, Bluetooth), WiMAX, etc., as will be appreciated by those skilled in the art.

In particular, the email messages stored on the mobile devices 36 may be synchronized with respective mailboxes 34 hosted on the email server 32. That is, the email server 32 provides the origin and destination for sending and receiving emails for a particular unique email address, which corresponds to a given mailbox 34 hosted by the email server 32. To this end, the mobile devices 36 also are configured to store email synchronization indicators for their respective mailbox (es) 34. Moreover, the system 30 further illustratively includes one or more email synchronization server(s) 40. Beginning at Block 50, the email synchronization server 40 is configured to establish synchronization sessions with the mobile devices 36 and retrieve the email synchronization indicators therefrom, at Block 51.

Generally speaking, a mobile device 36 establishes a session with the synchronization server 40, and the synchronization server accesses data from the mobile device required to establish the session. That is, a static configuration is not present between the synchronization server 40 and a given mobile device 36, rather the sessions are established dynamically and potentially with different synchronization servers in multiple server implementations, such as through load balancing, for example. A session may persist for an extended period of time (e.g., while a mobile device 36 is powered up and within a network coverage area), and thus many synchronization operations may occur during a given session. The session establishment process will be described further below with reference to FIG. 6.

Furthermore, the email synchronization server 40 is also configured to determine changes to the mailboxes 34 and synchronize respective email messages between the mobile devices 36 and the email server(s) 32 during the synchronization sessions based upon the retrieved email synchronization indicators, at Block 52. Generally speaking, the email synchronization indicators identify for the email synchronization server 40 what email messages or email processing actions were last taken during a prior synchronization session, so that it may be determined which email messages are new or what changes have been made in the interim. By way of example, the email synchronization indicators may comprise a unique identification (ID) of a last retrieved email message, an Internet Message Access Protocol (IMAP) high water mark, a synchronization anchor, etc., as will be appreciated by those skilled in the art (Block 51'). Synchronization operations performed by the email synchronization server 40 will be discussed further below with respect to FIGS. 7 and 8.

The email synchronization server 40 may also be configured to communicate updated email synchronization indicators to the mobile devices 36 upon performing synchronization operations, at Blocks 53 and 53', and terminate the synchronization sessions without storing of the updated email synchronization indicators at the email synchronization server 40, at Blocks 54 and 54', thus concluding the method illustrated in FIGS. 2 and 3 (Blocks 55 and 55'). That is, the email synchronization server 32 usefully performs the requisite processing and communication intensive email synchronization operations for the mobile devices 36, helping conserver their battery and processing resources. Yet, without having to store email synchronization indicators for numerous mobile devices 36 in an internal database, for example, this usefully saves on email synchronization server 40 memory resources and allows for ready deployment of new email synchronization servers as necessary, along with enhanced disaster recovery or failover options, as will be discussed further below. However, it should be noted that the email synchronization server 40 may temporarily store the email synchronization indicators and other account data while synchronization sessions are still active.

In addition to the email synchronization indicators, the mobile devices 36 may be further configured to store other information for accessing respective mailboxes 34, such as server access data, mailbox access data, or login credential data. The email synchronization server 32 may also be similarly configured to retrieve the server access data, mailbox access data, or login credential data from the mobile devices 36, and also use this information to determine changes to the mailboxes 34 (Blocks 51'-52'), as will be appreciated by those skilled in the art. By way of example, the server access data may comprise a server host address, a server port address, a server Secure Sockets Layer (SSL) indicator, etc. The mailbox access data may indicate a particular type of mailbox (e.g., GMail, Yahoo!, MSN, IMAP, etc.), which usefully informs the email synchronization server 40 of the appropriate protocols to use. The login credential data may include usernames, passwords, tokens, etc.

In some embodiments, the email server 32 and the mobile devices 36 may be further configured to store calendar or contact data as well. As such, the email synchronization server 40 may be further configured to also synchronize respective calendar or contact data between the mobile devices 36 and the email server 32 during the synchronization sessions.

Since the mobile devices 36 store the email synchronization indicators, and this information is synchronized with the email synchronization server 40 during session establishment, this allows the email synchronization server to do the "heavy lifting" in terms of synchronization processing and communication with the email server 32. Such synchronization processing may include synching, compressing, encrypting and formatting of messages for the mobile devices 36 for the lifetime of the session. This is of particular value to the mobile devices 36 in that the mobile devices do not have to spend their processing and memory resources nor undue battery power on synchronizing and downloading of potentially large emails, for example.

Additionally, by storing the email synchronization indicators with the mobile devices 36 between synchronization sessions, rather than with the email synchronization server(s) 40, the email synchronization servers no longer need to include durable storage (e.g., databases) for this information. This also allows for relatively high availability of the email synchronization data (i.e., by replication), as well as providing a directory for locating this data. Moreover, fail-over recovery need only involve an affected mobile device 36 connecting to another email synchronization server 40 within the same or different datacenter (i.e., disaster recovery) and re-synchronizing, as will be described further below.

Another significant benefit of this approach is that it usefully allows for an expanding user base through modular email synchronization server deployments which are not tied to respective user information databases. Moreover, this may also provide for reduced deployment and operating costs, while at the same time providing increased resiliency and downtime maintenance.

Further details of an example implementation of the system 30 will now be described with reference to FIGS. 4 through 8. For purposes of the following description, an example email protocol of IMAP plus the Lemonade (Enhancements to Internet email to Support Diverse Service Environments) extensions will be used for reference. However, other suitable protocols may also be used, as will be appreciated by those skilled in the art. In the example implementation, the email synchronization servers 40' are arranged in server farms at datacenters 42', and each illustratively includes one or more synchronization proxies 44' and a configuration database 46' for network carrier or ISP configuration information. Each synchronization proxy 44' may usefully provide synchronization service to any of the mobile device 36'.

The mobile devices 36' connect to a synchronization proxy 44' via a communication channel 48', such as an Internet access point name (APN) or relay, for example, as will be appreciated by those skilled in the art. The synchronization proxy 44' synchronizes mailboxes 34' (and, optionally, calendar or contact changes) with the mobile devices 36', and mobile device changes with the mailboxes. That is, the synchronization proxies 44' are responsible for routinely detecting changes at the mailboxes 34' and synchronizing these changes with the mobile devices 36', and vice-versa.

Figure 5:
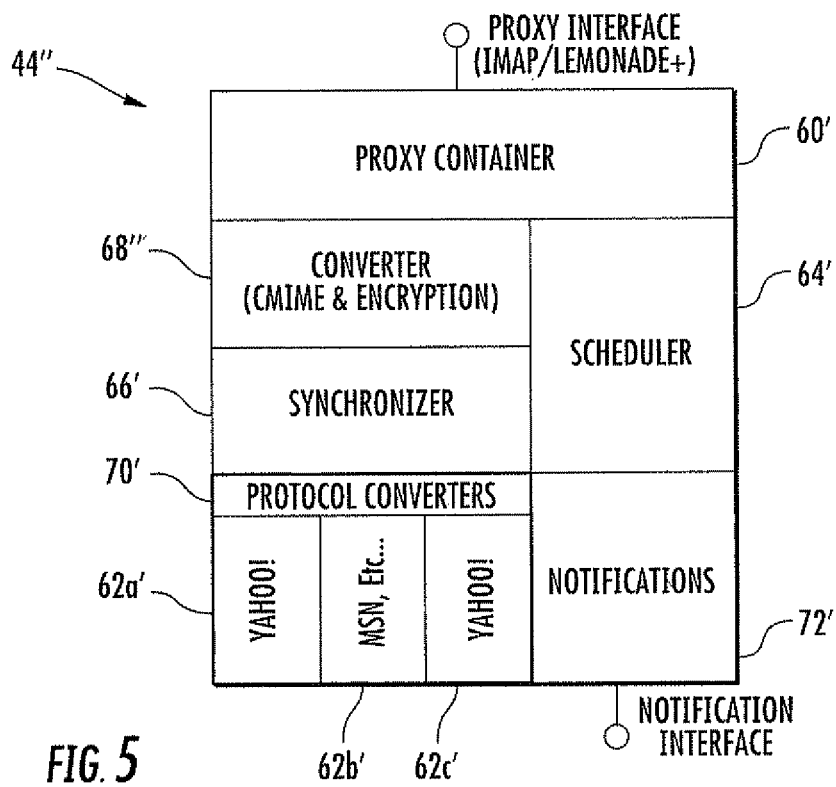
FIG. 5 is a schematic block diagram illustrating an example embodiment of a synchronization proxy of the system of FIG. 4.

As seen in FIG. 5, each synchronization proxy 44' illustratively includes a proxy container 60', to which incoming client commands are translated and dispatched. The results of those commands, if any, are then formed into an appropriate proxy interface response. The proxy container 60' also accepts messages or commands from proxy components 62a'-62c' and pushes them to the mobile devices 36'.

As sessions are established and dropped (i.e., terminated), a scheduler 64' respectively adds and removes sources (i.e., mailboxes 34') from its scheduling queues. Sources in the scheduling queues are uniformly scheduled over polling or synchronization periods. For sources that support notifications, the scheduler 64' will subscribe and unsubscribe accordingly, as will be discussed further below with respect to FIG. 8. When a source is ready for synchronization, the scheduler 64' dispatches a command to a synchronizer 66' to begin the process. When the synchronizer 66' is done, the source is re-scheduled for its next synchronization.

More particularly, the synchronizer 66' is responsible for the discovery of changes that occur at the mailboxes 34', and pushing those changes to the mobile devices 36' via a converter 68' and the proxy container 60'. The synchronizer 66' is also responsible for synchronizing changes from the mobile devices 36' (e.g., delete, re/unread, forward, reply, send, etc.) to the source. The synchronizer 66' uses the mailbox configuration to start a session with the mailbox 34' via protocol converters 70'. The converter 68' is responsible for compression (i.e., to the mobile devices 36') and decompression (i.e., from the mobile devices) of email messages being passed to and from the mobile devices.

Figure 8:
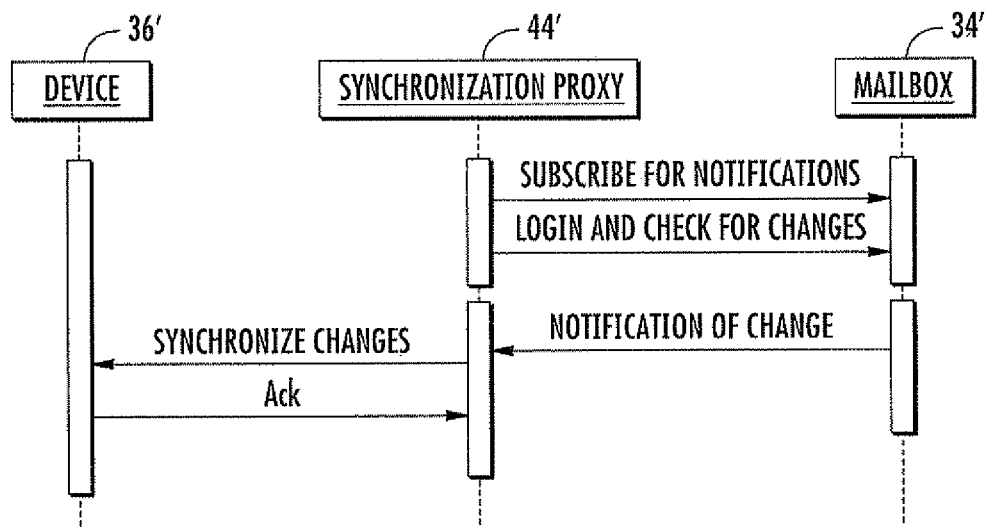

For sources that support notifications, a notifications component 72' is responsible for subscribing, listening, and dispatching events from the ISP, as shown in FIG. 8. Notifications are dispatched to the scheduler 64' to initiate source synchronization. The protocol converters 70' provide a common interface to proxy components 62a'-62c' which communicate in the appropriate format for respective mailbox types (e.g., IMAP, POP, MSN, Yahoo!, etc.). The converters 70' are used by the synchronizer 66' to synchronize the mailbox 34'.

During operation, a mobile device 36' may open a TCP connection via the carrier APN/relay 48' for the duration of the synchronization session with a given synchronization proxy 44', for example. This connection is then used for all traffic to and from the mobile device 36'. The synchronization proxy 44' will connect to the ISP server 32' as necessary to synchronize the mailbox 34' and to subscribe for notifications. The ISP server 32' may open a connection to a synchronization proxy 44' for notification of mailbox changes, as seen in FIG. 8. This approach usefully simplifies the system 30' in that no routing of messages to the proxy instance servicing a particular account is required, as will be appreciated by those skilled in the art. However, other approaches may be used, such as a non-permanent connection from the given mobile device 36', and using the carrier APN/relay 48' as a back channel to the mobile device, as will also be appreciated by the skilled artisan.

Figure 6:
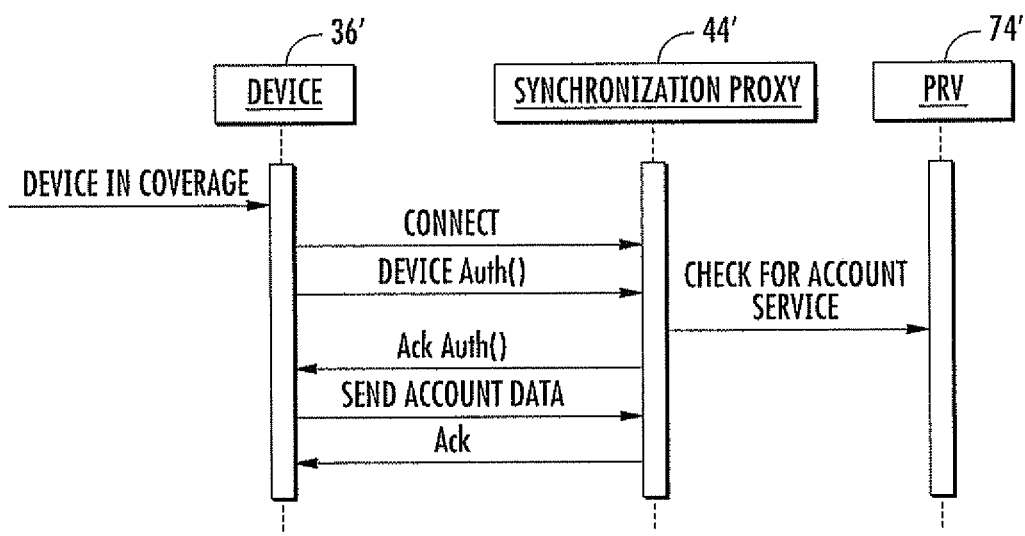
FIG. 6 is a system flow sequence diagram illustrating session establishment between the mobile wireless communications devices and email synchronization server of the system of FIG. 4.

Referring to FIG. 6, whenever a mobile device 36' comes into coverage (cellular, WiFi, etc.), it creates a connection and establishes a session with a synchronization proxy 44'. The establishment of the session includes synchronizing all appropriate account configuration and synchronization data, including items such as: mailbox type (MSN, IMAP, Google, etc.); login credentials (username, password, token, etc.); sync data (UIDs, IMAP high water mark, sync anchor, etc.); and server info (host, port, SSL, etc), as discussed above. Again, the amount of configuration data will typically depend on the type of mailbox with which synchronization is to be performed. The synchronization proxy may also check with a provisioning module 74' (PRV) to verify the existence of a valid account for the given mobile device 36'.

Figure 7:
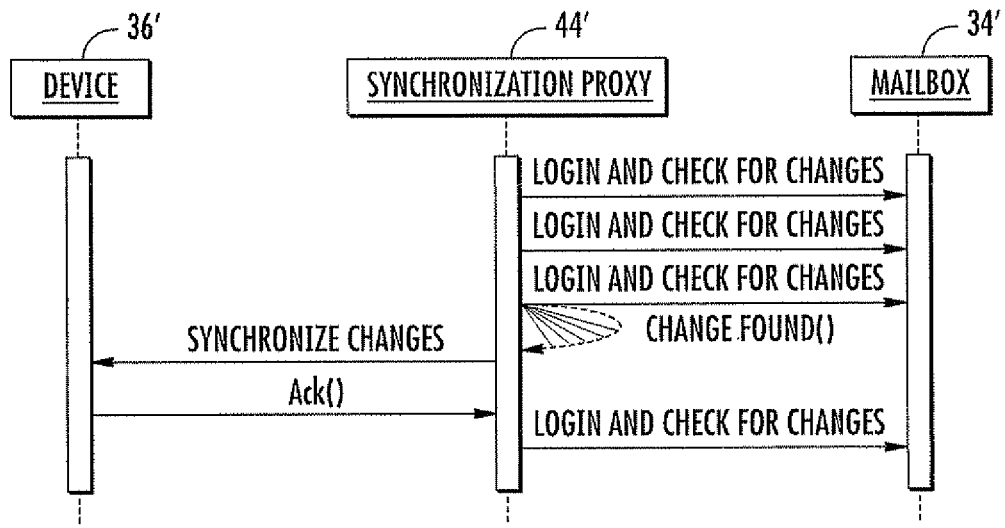
FIGS. 7 and 8 are system flow sequence diagrams illustrating mailbox synchronization operations performed by the email synchronization server of the system of FIG. 4 for non-notification and notification-based mailboxes, respectively.

With respect to synchronization from the mailbox 34' to the mobile device 36', once a session is established, the synchronization proxy 44' will begin periodic checks for mailbox changes in the case where the mailbox does not provide notifications, as illustrated in FIG. 7. When a mailbox change is detected the changes will be synchronized to the mobile device 36', as shown. In the case where the mailbox does support notifications, as seen in FIG. 8, synchronization messages sent back to the mobile device 36' via the carrier APN/relay 48' (e.g., using CMIME protocol) will not only include the appropriate synchronization information for email messages, contacts, or calendar items, but they will also include the email synchronization indicators noted above (i.e., message IDs, high water marks, etc.).

Whenever a mobile device 36' needs to synchronize changes with the mailbox (e.g., delete or mark as read), the mobile device communicates the requisite operations to the synchronization proxy 44' via the session connection. Furthermore, operations such as "more", "reply", "forward" and "compose" will also be sent over the session connection. Just as in the case of synchronization data being sent from the mailbox to the mobile device 36' discussed above, the same type of data (e.g., sent via CMIME) will be sent along with these commands and with the addition of the related email synchronization indicators (i.e., these indicators will again be communicated back to the mobile device).

Figure 4:
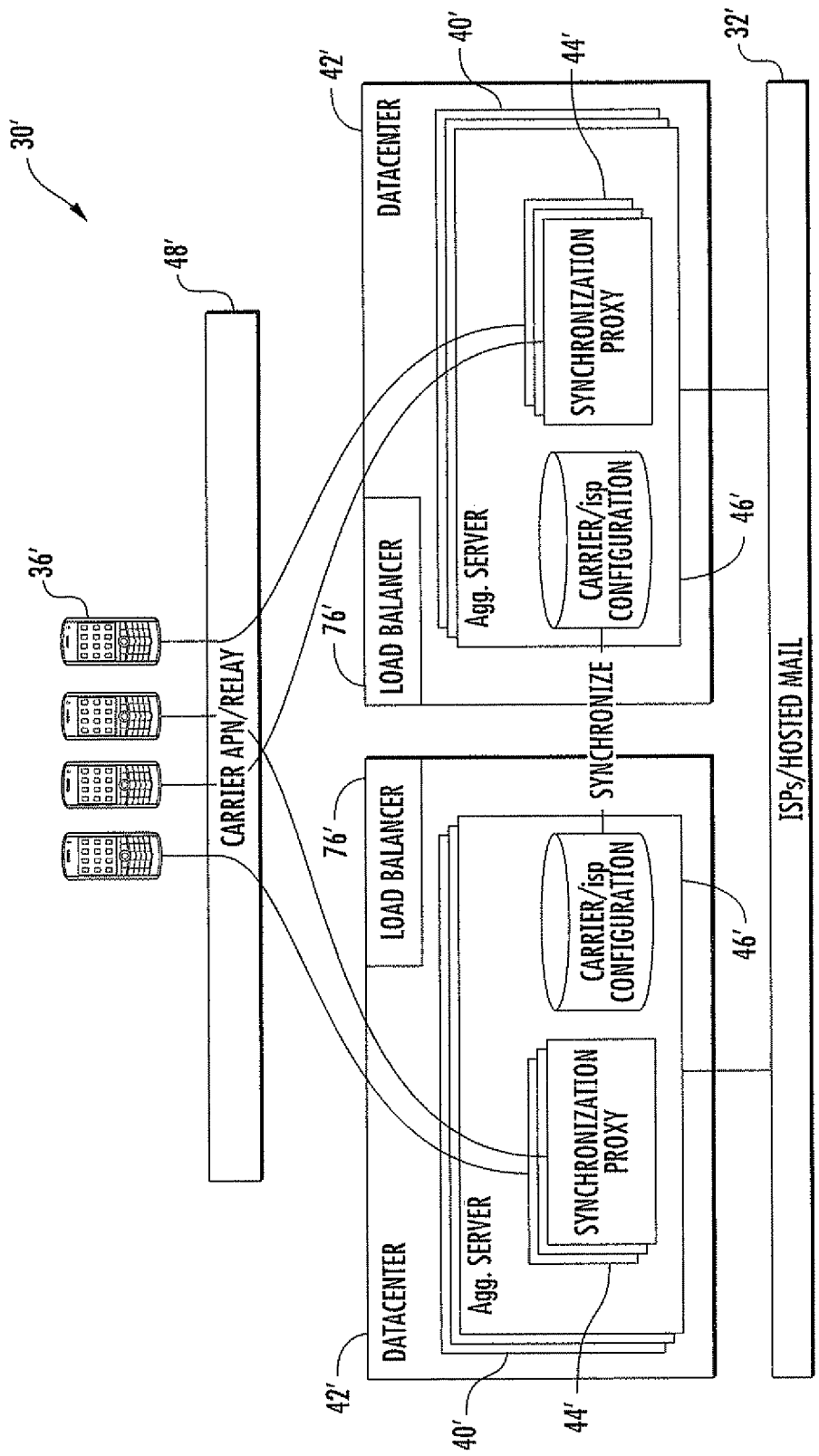
FIG. 4 is a schematic block diagram of an alternative embodiment of the email system of FIG. 1 including a plurality of geographically distributed email synchronization servers located at different datacenters.

The geographically distributed synchronization server arrangement illustrated in FIG. 4 usefully allows for enhanced failover response. That is, if a synchronization proxy 44' fails for some reason, the mobile device 36' will lose its connection with that synchronization proxy, but it merely has to repeat the session establishment sequence to establish a new synchronization session with a different synchronization proxy 44', either at the same datacenter 42' or a different datacenter. That is, in the event of an email synchronization sever 40' outage, the synchronization session information may be replicated to another email synchronization server, at Blocks 56'-57' (FIG. 3).

Another potential security benefit of the above-described approach is that login credential data (e.g., passwords) do not need to be stored by the email synchronization servers 40'. This may be of particular benefit in that certain ISPs may not allow an intermediary email synchronization service provider to store passwords on behalf of users. Instead, the login credential information may be passed through to the ISP during session establishment.

Still another security benefit of this approach is that when a mobile device 36' is sold or transferred, a "wipe" of the device memory will be sufficient to prevent messages from being sent to the wrong mobile device. This is because synchronization of a mailbox 34' occurs while a mobile device 36' has a session established. Since wiping a mobile device 36' will cause the session to be lost, synchronization to that mobile device will be stopped.

As briefly noted above, another significant benefit of the above described approach is the ability to scale for multiple datacenter deployment. Deployment across multiple datacenters 42' allows for continued subscriber growth, as well as providing redundancy for disaster recovery. Each email synchronization server 40' may be configured as an individual unit from a scalability and isolation standpoint which shares little or no resources with other email synchronization servers. The system 30' may be configured so that any mobile device 36' is able to usefully connect with any email synchronization server 40'. Load balancing may be performed across the datacenters 42' using load balancers 76', such as a domain name system (DNS) based global traffic manager (GTM), for example, as will be appreciated by those skilled in the art. Carrier and ISP configuration may be duplicated across email synchronization servers 40' through one or more methods such as database replication, nightly synchronizations or administrative scripts/consoles. The method of replication will depend on the consistency requirements of the data, as will be appreciated by those skilled in the art.

With the above-described architecture, an example disaster recovery approach would entail that when a datacenter 42' is lost, the remaining datacenter(s) have a combined surplus capacity equal to the capacity of the largest datacenter. If a disaster occurs, then each mobile device 36' connected to the lost datacenter 42' will re-establish a synchronization session through the load balancer 76' with one of the remaining datacenters.

In some implementations, the synchronization proxies 44' (or other component within a datacenter 42') may be configured to provide session debugging or logging. That is, synchronization session information may be logged to help locate which synchronization proxies 44' have performed synchronization for a given mobile device 36' or mailbox 34' to allow for trouble shooting performance issues.

Example components of a mobile wireless communications device that may be used in accordance with an example embodiment are further described below with reference to FIGS. 9-12. Generally speaking, a mobile device may be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 9-12.

Figure 9:
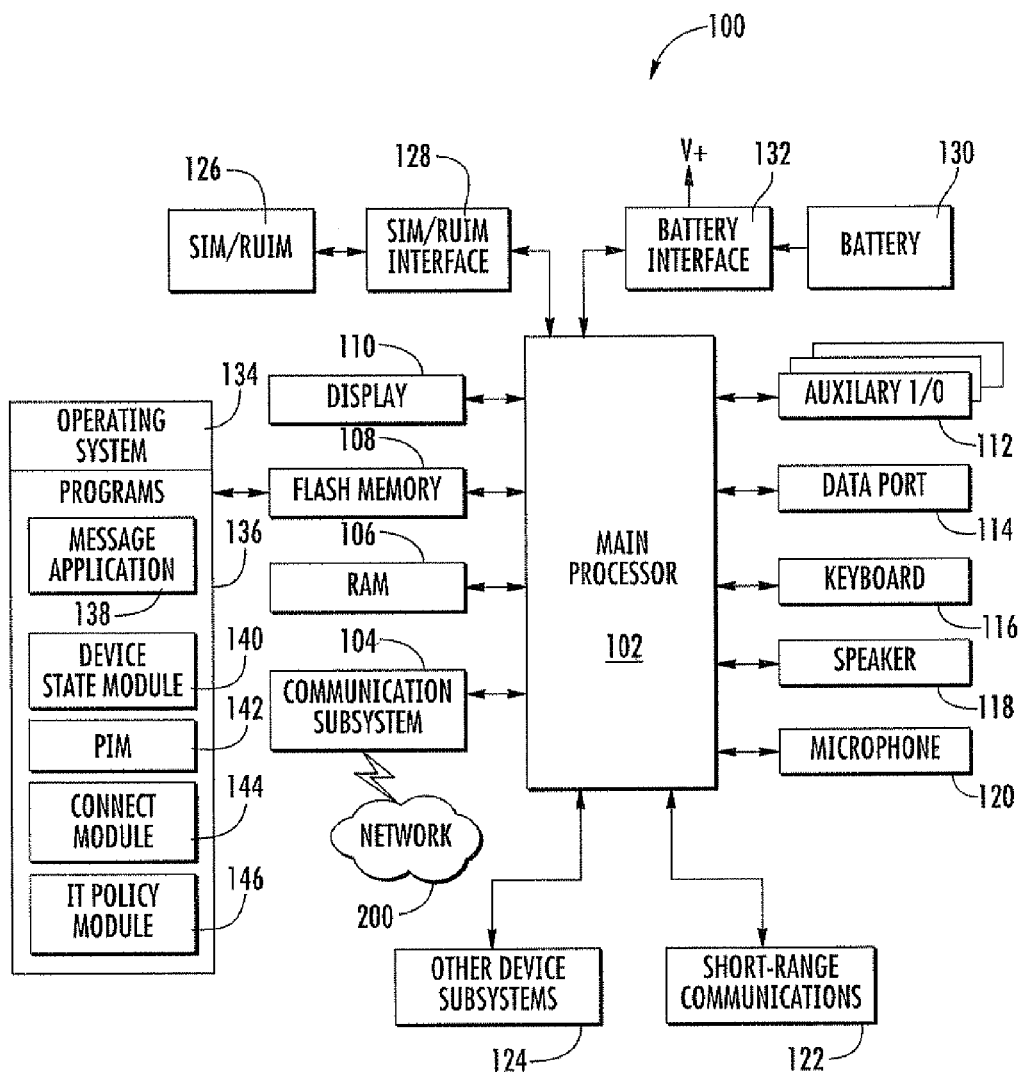
FIG. 9 is a block diagram of an example embodiment of a mobile device that may be used with the system of FIG. 1.

Referring first to FIG. 9, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). A benefit of using the SIM card/RUIM 126 is that a subscriber is not necessarily bound by any single physical mobile device. The SIM card/RUIM 126 may store additional subscriber information for a mobile device as well, including date book (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e., the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly useful when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 11 and 12, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 10:
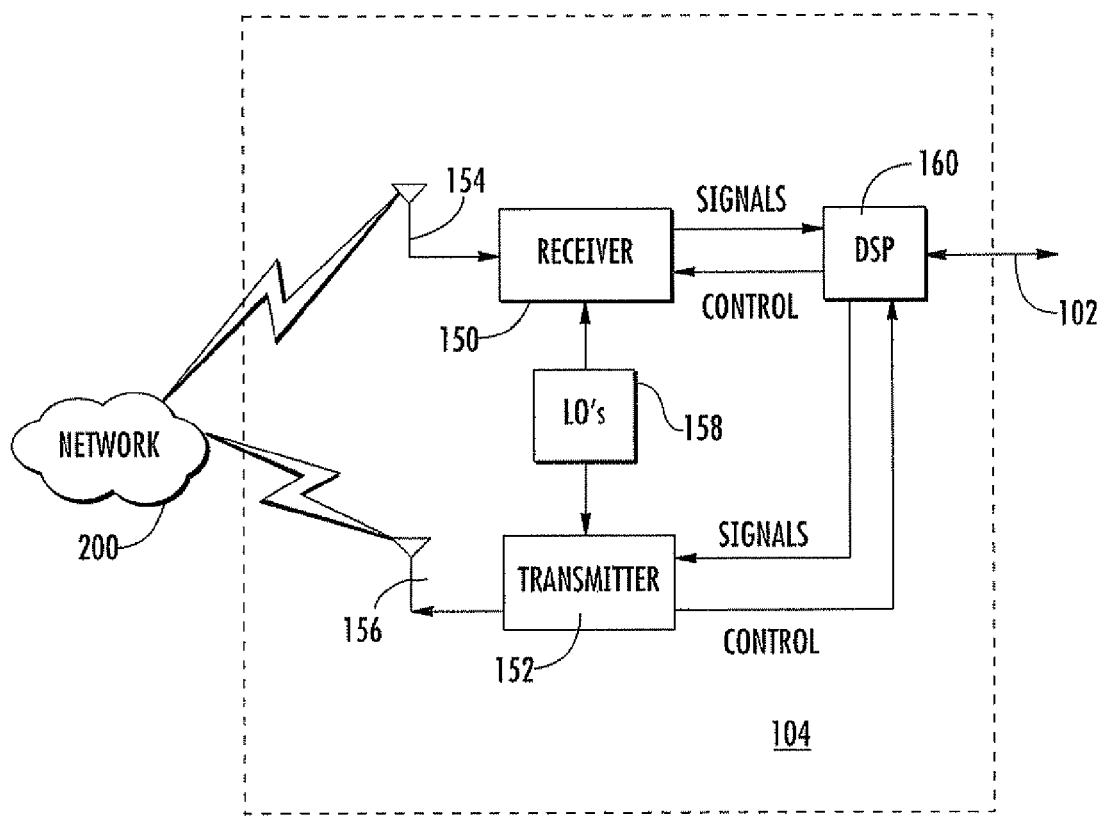
FIG. 10 is a block diagram of an example embodiment of a communication subsystem component of the mobile device of FIG. 9.

Referring now to FIG. 10, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 10 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 11:
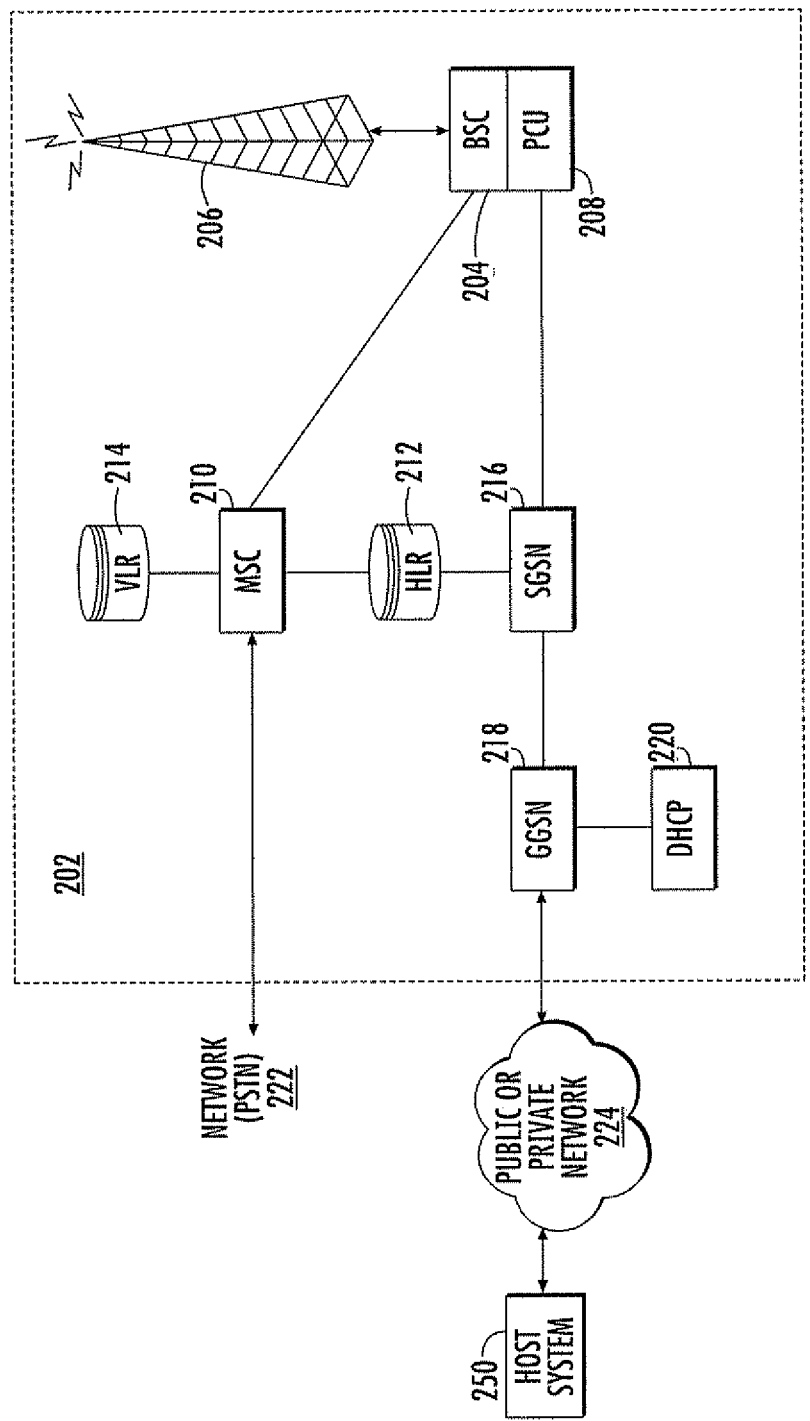
FIG. 11 is an example block diagram of a node of a wireless network.

Referring now to FIG. 11, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 11, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 12:
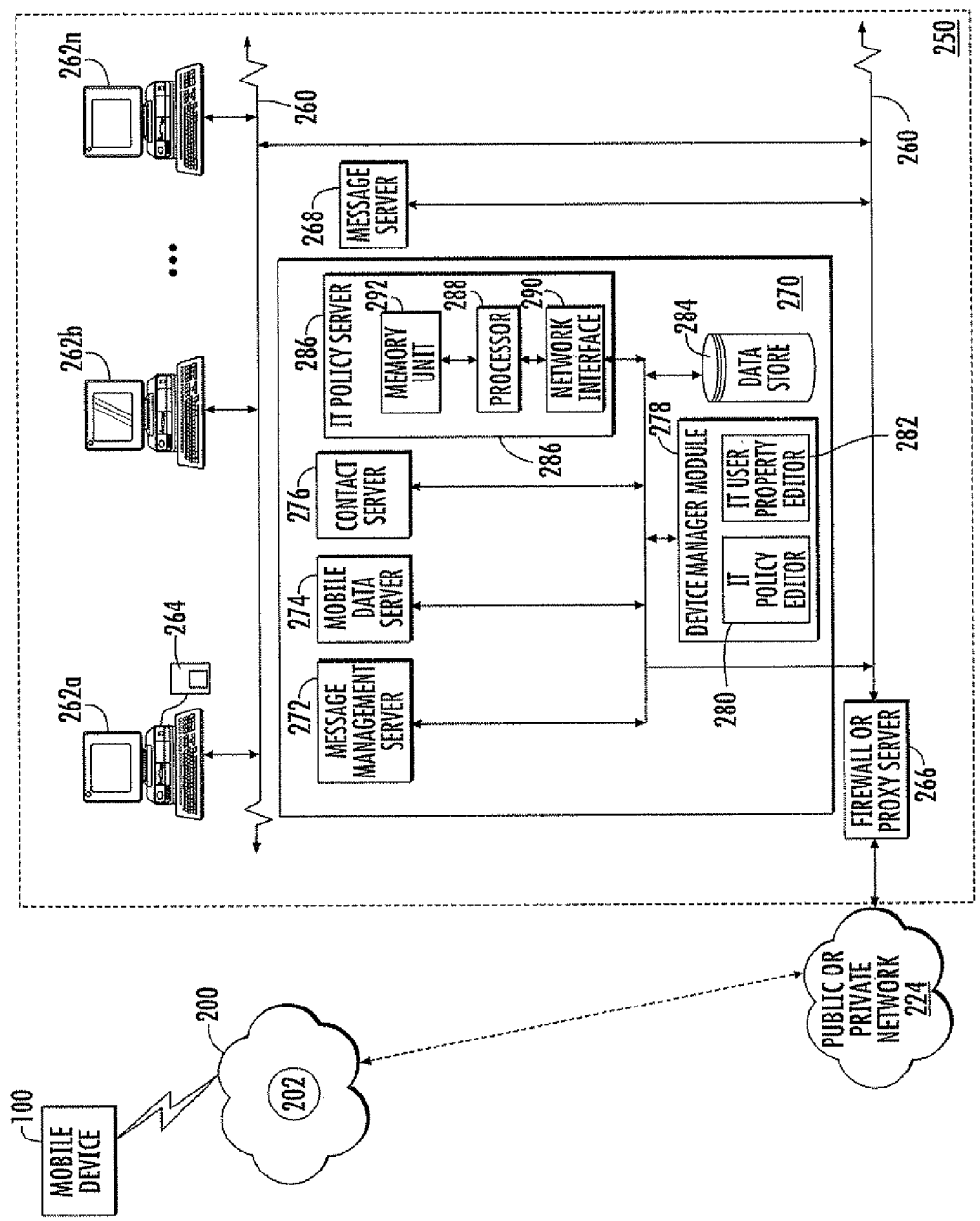
FIG. 12 is a block diagram illustrating components of a host system in one example configuration for use with the wireless network of FIG. 11 and the mobile device of FIG. 9.

Referring now to FIG. 12, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 12, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g., PIM data, private symmetric encryption keys to facilitate secure communications) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 12. Furthermore, only a subset of network components of the host system 250 are shown in FIG. 9 for ease of exposition, and it will be understood by persons skilled in the art that the host system 250 will include additional components that are not explicitly shown in FIG. 10 for this example configuration. More generally, the host system 250 may represent a smaller part of a larger network (not shown) of the organization, and may include different components and/or be arranged in different topologies than that shown in the example embodiment of FIG. 12.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An benefit of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268.

Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an email client application operating on a user's computer 262a may request the email messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e., those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g., the message store associated with the user's account on the message server 268) for new email messages, and apply user-definable filters to new messages to determine if and how the messages are relayed to the user's mobile device 100. The message management server 272 may also compress and encrypt new messages (e.g., using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g., encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g., by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g., "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g., 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g., encryption algorithms, password rules, etc.), specifying themes or applications that are allowed to run on the mobile device 100, and the like.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

FIGS. 2-3 are flow diagrams and FIGS. 6-8 are flow sequence diagrams for example embodiment methods. Some of the steps illustrated in the diagrams may be performed in an order other than that which is described. Also, it should be appreciated that not all of the steps described in the flow chart are required to be performed, that additional steps may be added, and that some of the illustrated steps may be substituted with other steps.

That which is claimed is:

1. An electronic mail (email) system comprising:
an email server configured to store email messages;
a mobile wireless communications device configured to store email messages and an email synchronization indicator for a mailbox; and
an email synchronization server configured to:
establish a synchronization session with the mobile wireless communications device and retrieve the email synchronization indicator therefrom,
determine changes to the mailbox and synchronize the email messages between the mobile wireless communications and the email server based upon the email synchronization indicator,
update the email synchronization indicator based upon synchronization of the email messages,
communicate the updated email synchronization indicator to the mobile wireless communications device, and
terminate the synchronization session without storing the updated email synchronization indicator at the email synchronization server.

2. The email system of claim 1 wherein the email synchronization server comprises a plurality of geographically distributed email synchronization servers.

3. The email system of claim 2 wherein the plurality of geographically distributed email synchronization servers cooperate to replicate synchronization sessions between one another based upon server outages.

4. The email system of claim 1 wherein the email synchronization indicator comprises at least one of a unique identification (ID) of a last retrieved email message, an Internet Message Access Protocol (IMAP) high water mark, and a synchronization anchor.

5. The email system of claim 1 wherein the mobile wireless communications device is further configured to store server access data; and wherein the email synchronization server is further configured to retrieve the server access data from the mobile wireless communications device and determine changes to the mailbox also based thereon.

6. The email system of claim 5 wherein the server access data comprises at least one of a server host address, a server port address, and a server Secure Sockets Layer (SSL) indicator.

7. The email system of claim 1 wherein the mobile wireless communications device is further configured to store mailbox access data; and wherein the email synchronization server is further configured to retrieve the mailbox access data from the mobile wireless communications device and determine changes to the mailbox also based thereon.

8. The email system of claim 1 wherein the mobile wireless communications device is further configured to store login credential data; and wherein the email synchronization server is further configured to retrieve the login credential data from the mobile wireless communications device and determine changes to the mailbox also based thereon.

9. The email system of claim 1 wherein the email server and the mobile wireless communications device are further configured to store calendar data; and wherein the email synchronization server is further configured to synchronize respective calendar data between the mobile wireless communications and the email server during the synchronization sessions.

10. The email system of claim 1 wherein the email server and the mobile wireless communications are further configured to store contact data; and wherein the email synchronization server is further configured to synchronize respective contact data between the mobile wireless communications device and the email server during the synchronization sessions.

11. The email system of claim 1 wherein the mobile wireless communications device comprises a cellular device.

12. An electronic mail (email) system comprising:
an email server configured to store email messages in a mailbox;
a mobile wireless communications configured to store email messages and an email synchronization indicator for a mailbox comprising a unique identification (ID) of a last retrieved email message, an Internet Message Access Protocol (IMAP) high water mark, and a synchronization anchor; and
a plurality of geographically distributed email synchronization servers each configured to:
establish a synchronization session with the mobile wireless communications device and retrieve the email synchronization therefrom,
determine changes to the mailbox and synchronize respective email messages between the mobile wireless communications device and the email server during the synchronization session based upon the retrieved email synchronization indicator,
update the email synchronization indicator based upon synchronization of the email messages,
communicate the updated email synchronization indicator to the mobile wireless communications device,
terminate the synchronization session without storing of the updated email synchronization indicator at the email synchronization server, and
cooperate to replicate synchronization sessions between the email synchronization servers based upon server outages.

13. The email system of claim 12 wherein the mobile wireless communications device is further configured to store server access data; and wherein the email synchronization servers are further configured to retrieve the server access data from the mobile wireless communications device and determine changes to the mailbox also based thereon.

14. The email system of claim 13 wherein the server access data comprises at least one of a server host address, a server port address, and a server Secure Sockets Layer (SSL) indicator.

15. The email system of claim 12 wherein the mobile wireless communications device is further configured to store mailbox access data; and wherein the email synchronization servers are further configured to retrieve the mailbox access data from the mobile wireless communications device and determine changes to the mailbox also based thereon.

16. The email system of claim 12 wherein the mobile wireless communications device is further configured to store login credential data; and wherein the email synchronization servers are further configured to retrieve the login credential data from the mobile wireless communications device and determine changes to the mailbox also based thereon.

17. An electronic mail method comprising:
    storing email messages in a mailbox on an email server;
    storing email messages and an email synchronization indicator for a respective mailbox on a mobile wireless communications device;
    establishing a synchronization session between an email synchronization server and the mobile wireless communications device and retrieving the email synchronization indicator from the mobile wireless communications device to the et least one email synchronization server;
    determining changes to the mailbox and synchronizing the email messages between the mobile wireless communications device and the email server during the synchronization session at the email synchronization server based upon the retrieved email synchronization indicator;
    updating the email synchronization indicator based upon synchronization of the email messages,
    communicating the updated email synchronization indicator from the email synchronization server to the mobile wireless communications device; and
    terminating the synchronization session without storing of the updated email synchronization indicator at the et least one email synchronization server.

18. The method of claim 17 wherein the email synchronization server comprises a plurality of geographically distributed email synchronization servers.

19. The method of claim 18 further comprising cooperating among the plurality of geographically distributed email synchronization servers to replicate synchronization sessions between one another based upon server outages.

20. The method of claim 17 wherein the email synchronization indicator comprises at least one of a unique identification (ID) of a last retrieved email message, an Internet Message Access Protocol (IMAP) high water mark, and a synchronization anchor.

21. The method of claim 17 further comprising storing server access data on the mobile wireless communications device; and further comprising retrieving the server access data from the mobile wireless communications device to the email synchronization server.

22. The method of claim 21 wherein the server access data comprises at least one of a server host address, a server port address, and a server Secure Sockets Layer (SSL) indicator.

23. The method of claim 17 further comprising storing mailbox access data on the mobile wireless communications device; and further comprising retrieving the mailbox access data from the mobile wireless communications device to the email synchronization server.

24. The method of claim 17 further comprising storing login credential data on the mobile wireless communications device; and further comprising retrieving the login credential data from the mobile wireless communications device to the email synchronization server.

* * * * *